(12) United States Patent  
Dunkelberger et al.

(10) Patent No.: US 8,589,404 B1
(45) Date of Patent: Nov. 19, 2013

(54) SEMANTIC DATA INTEGRATION (75) Inventors: Kirk Dunkelberger, Fort Wayne, IN (US); Eva-Marie Proszkow, Silver Spring, MD (US); Jason S. Byassee, Highlands Ranch, CO (US); Keith E. Mathias, Parker, CO (US); Earl C. Pilloud, Parker, CO (US); Daniel A. Pier, Englewood, CO (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/527,268

(22) Filed: Jun. 19, 2012

(51) Int. Cl.
*G06F 17/30* (2006.01)
(52) U.S. Cl.
USPC .......................................... 707/743; 707/736
(58) Field of Classification Search
USPC ................................... 707/743, 737
See application file for complete search history.

(56) References Cited

U.S. PATENT DOCUMENTS

| 7,716,162 | B2* | 5/2010 | Egnor | 707/724 |
| 2001/0009009 | A1* | 7/2001 | Iizuka | 707/539 |
| 2004/0167888 | A1* | 8/2004 | Kayahara et al. | 707/3 |
| 2008/0183653 | A1* | 7/2008 | Byrnes et al. | 706/50 |
| 2009/0055394 | A1* | 2/2009 | Schilit et al. | 707/6 |
| 2010/0049498 | A1* | 2/2010 | Cao et al. | 704/9 |
| 2010/0281030 | A1* | 11/2010 | Kusumura et al. | 707/741 |
| 2011/0172988 | A1* | 7/2011 | Wang et al. | 704/9 |

OTHER PUBLICATIONS

Lebanon, et al.: "*The Locally Weighted Bag of Words Framework for Document Representation*"; Journal of Machine Learning Research 8, Published Oct. 2007, pp. 2405-2441.

\* cited by examiner

*Primary Examiner* — Debbie Le
(74) *Attorney, Agent, or Firm* — Tarolli, Sundheim, Covell & Tummino LLP (57) ABSTRACT

Systems and methods are provided for retrieving data relevant to a subject of interest. Occurrences of each of a plurality of n-grams within the data record are identified. A multinomial distribution is defined from the respective numbers of occurrence of a subset of the plurality of n-grams. The multinomial distribution is stored in a semantic model as a point on an information manifold. The semantic model is configured to represent an indexed family of probability distributions as points on the information manifold. It is determined if the data record is relevant to the subject of interest according to the position of the point on the information manifold, and the data record is retrieved if the data record is relevant to the subject of interest.

19 Claims, 4 Drawing Sheets

SEMANTIC DATA INTEGRATION

TECHNICAL FIELD

The present invention relates generally to information science, and more particularly to systems and methods utilizing semantic data integration.

BACKGROUND

Information science is an interdisciplinary science primarily concerned with the analysis, collection, classification, manipulation, storage, retrieval, dissemination, and understanding of information and knowledge derived from that information. Practitioners within the field study the application and usage of knowledge in organizations, along with the interaction between people, organizations and any existing information systems, with the aim of creating, replacing, improving or understanding information systems. Information science is a broad, interdisciplinary field, incorporating not only aspects of computer science, but often diverse fields such as archival science, cognitive science, commerce, communications, law, library science, museology, management, mathematics, philosophy, public policy, and the social sciences.

SUMMARY

In accordance with one aspect of the present invention, a system is provided for identifying the relevance of a data record to a subject of interest. The system includes a set of at least one non-transitory computer readable medium storing machine executable instructions and a processor operatively connected to at least one of the set of non-transitory computer readable media and configured to execute at least a subset of the machine instructions. The machine executable instructions provide an indexer configured to identify occurrences of each of a plurality of phrases of interest within the data record and a distribution generator configured to associate at least one of the n-grams with a semantic parameter and define a multinomial distribution from the respective numbers of occurrence of a subset of the plurality of n-grams and the assigned semantic parameter. A semantic model is configured to represent a family of probability distributions as an information manifold, and the semantic model stores the multinomial distribution as a point on the information manifold. A classifier is configured to determine the relevance of the data record according to the position of the point on the information manifold.

In accordance with another aspect of the present invention, a method is provided for retrieving data relevant to a subject of interest. Respective initial multinomial distributions are created from each of a plurality of data records. Each initial multinomial distribution is augmented with a semantic parameter to form an augmented multinomial distribution. The semantic parameter represents a portion of the semantic content of the data record associated with the initial multinomial distribution. A semantic model representing the plurality of augmented distributions as points on an information manifold is created. A region is defined on the information manifold associated with the subject of interest, and at least one data record within the defined region is retrieved. In fact, any number of (or all) data records can be retrieved and the distance to the region of interest model can be used for controlling the number of records retrieved.

In accordance with yet another aspect of the present invention, a method is provided for retrieving data relevant to a subject of interest for a user. Occurrences of each of a plurality of n-grams within the data record are identified. A multinomial distribution is defined from the respective numbers of occurrence of a subset of the plurality of n-grams. The multinomial distribution is represented in a semantic model as a point on an information manifold. The semantic model is configured to represent indexed distributions as points on an n-simplex information manifold, where n is an integer greater than one. It is determined if the data record is relevant to the subject of interest according to the position of the point on the information manifold, and the data record is provided to the user for review if the data record is relevant to the subject of interest.

DETAILED DESCRIPTION

In order to improve the accuracy and precision of information systems, the uncertainty of data must be explicitly accommodated in the search methods applied. Typically, this uncertainty is represented using probability distributions. The probability distributions for a given data source are drawn from a single family that best represents the uncertainty associated with that data. The parameters of a given probability distribution family define an information space. A specific instance of a probability distribution family, as defined by a particular set of parameter values, is represented as a point in this space. Each information space has an intrinsic geometry implied by the definition of its probability distribution family. The information space is a manifold in a strict mathematical sense. The distance between points on a manifold defined by a probability distribution family is used herein as a definition of similarity for uncertain data.

The concept of similarity is fundamental to understanding data whether the data is symbolic, numeric, textual, etc. In order to take advantage of the similarities found in data, uncertain or otherwise, a distance metric that exploits the inherent properties of the information is provided. The distance metric must exploit the inherent features that represent the information and the optimal distance metric for a probability distribution family is selected to account for the geometry of its manifold. The distance is a geodesic, a shortest path, between two points with all points along the path being valid points on the manifold. In the systems and methods herein, a multinomial distribution is represented by a set of parameters, each of which represents a specific symbol. The parameters can be normalized, such that the values sum to one as to constrain the geometry of multinomial distributions to include only the points on an n-simplex. The distance between two multinomial distributions is a geodesic on an n-simplex.

Text data consists of a set of symbols. In the systems and methods presented herein, a text segment is represented as a multinomial distribution consisting of normalized symbol frequencies. Therefore, each document (as represented by the multinomial distribution) is a point on the n-simplex of documents. It follows that the similarity of two documents is the geodesic between those points. Based on this definition of similarity, we can sort and search documents relative to any point on the n-simplex. The symbol selection defines the semantics of the distance because they become the axes of the manifold and bound its descriptive power. A symbol set consisting of noun and verb frequencies provides a metric for document topic. A symbol set based on simple structural parameters provides a metric for document author.

Any data that can be represented by the multinomial distribution family can be sorted and searched using this approach. This method is not unique to textual data. Using the 365 days of the year, or any other time interval, as the symbol set, patterns of activity can be recognized based on the (normalized) frequency of an event. Similarly, using degrees of latitude and longitude as the symbol set, potential meeting locations can be identified based on the (normalized) count of the number of vehicles.

In the methods defined herein, referred to as Semantic Data Alignment (SDA), uncertain data, such as textual content, time/date metadata, and extracted geo-spatial references, are expressed as instances of multinomial distributions. Expression of multiple data types using a single multinomial distribution and thereby a single composite manifold that captures complete context, provides a coherent treatment of data impossible in other approaches without secondary methods. Example data, identified as desirable (e.g., relevant, positive, etc.) and undesirable (e.g., irrelevant, negative, etc.) in a specific context, are used to build a model for searching within that context. This model effectively defines a topological region of interest on the information manifold. All data falling within the region are identified as relevant; data falling outside the region are labeled irrelevant. All data within the relevant region belong to the same context as the positive example data, i.e. they are semantically aligned. By allowing the user to identify relevant data examples, SDA uses the region of interest on the information manifold that is consistent with the user context to search and sort all data and discover the data that is conceptually adjacent with the user context.

Semantic data alignment (SDA) organizes data according to the conceptual adjacency of data input to the system, allowing a human operator to query the SDA system and retrieve documents that a human would understand to be relevant to the query. To this end, SDA builds a multidimensional mathematical information model from samples of the data of interest and then uses the model to rapidly measure conceptual adjacency (i.e., relevance) of new and existing data. These multidimensional models consist of frequencies of occurrence of the features being measured to form a multinomial distribution. For example, the frequency of individual words or phrases or other symbols or groups of multiple symbols, referred to herein as "n-grams," can be counted and placed in the bin corresponding to each word. Bins can also be formed for any data item that can be quantized such as time intervals, parametric values, and even locations.

Figure 1:
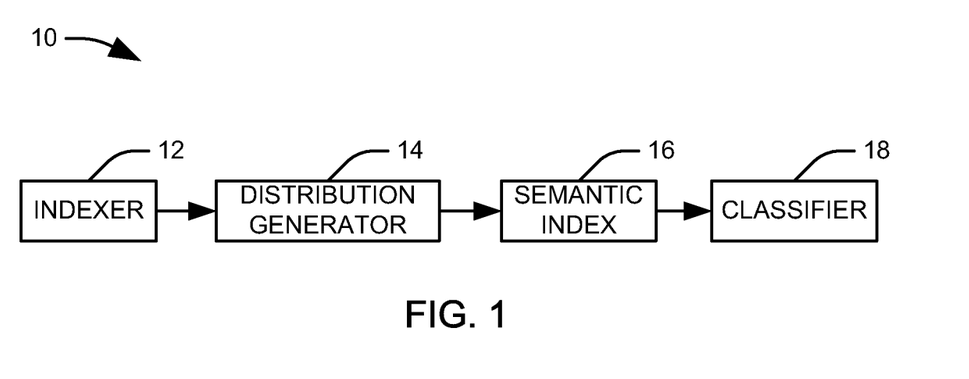
FIG. 1 illustrates one example of a system incorporating semantic data alignment in accordance with an aspect of the invention.

FIG. 1 illustrates one example of a system 10 incorporating semantic data alignment in accordance with an aspect of the invention. In the present example, the system 10 includes an indexer 12 that receives data records from one or more data sources (not shown). It will be appreciated that a "data record" as used herein should be read to include any data in a form reducible to symbols with associated meanings, intersymbol structure (syntax), and associated source properties, and can include video, audio, structured text, unstructured text, semi-structured text, and modulated electromagnetic radiation. For example, a data record can include all or portions of any of a television or radio broadcast, a raw radio signal, a voicemail, an e-mail, logged chat room activity, a web page, a database record, or similar data. It will be appreciate that the system can be implemented as software or programmable digital logic stored on a non-transitory machine readable medium and executed by a processor. In one implementation, the system could be implemented as a content addressable memory (CAM) in a field programmable gate array (FPGA) or similar device. Alternatively, the system could be implemented as software instructions and executed by a general purpose processor.

The indexer 12 configured to identify occurrences of each of a plurality of n-grams, that is, a symbol or multiple symbols, within the data record. A set of n-grams that will be identified by the system can be selected by a human operator, determined during operation, or all n-grams meeting a set of logical rules can be identified. The number of occurrences of each n-gram can be recorded and provided to a distribution generator 14. In one implementation, the number of occurrences for each n-gram can first be normalized according to a number of n-grams identified in the data record. It will thus be appreciated that a "number of occurrences" as used herein, can refer to either of a raw count of the number of occurrences of a given n-gram or a normalized count of the occurrences.

The distribution generator 14 is configured to associate at least one of the n-grams with a semantic parameter and define a multinomial distribution from the respective numbers of occurrence of a subset of the plurality of n-grams and the assigned semantic parameter. As used herein, a semantic parameter is a value derived from the associated meanings, inter-symbol structure (syntax), and associated source properties of a data record. Examples of semantic parameters in a text document can include temporal data, geospatial data, personal relationships, and all similar concepts. For non-text symbols, these parameters can include the source, time, or location of a communication, signal characteristics of a radio frequency communication, or any other similar parameter that does not represent the frequency of occurrence of symbols within the data record. It will be appreciated that the use of semantic parameters in accordance with an aspect of the present invention can reveal a relevancy between concepts that is not immediately apparent from the mere frequency of occurrence of n-grams within a given record.

As a simplified example for a text document, a first document might describe a first event occurring in El Paso, Tex., and a second document might describe a second event in Juárez, Mexico. A naïve review of the word counts of each document might reveal no relation, but the close spatial proximity of the two cities is potential evidence of a relation between the events described in the two documents. In one implementation of the illustrated system 10, described in further detail in FIG. 2 below, a semantic parameter based on latitude and longitude is assigned to represent the locations mentioned within a document. Specifically, one or more series of subregions can be defined, each representing a range of latitudes and longitudes, and the document can be associated with one or more of the subregions. Using this system, it is clear that El Paso and Juárez are likely to fall within the same subregion, allowing the system 10 to recognize the geospatial proximity of the first and second events.

The defined multinomial distribution is then provided to a semantic index 16 configured to represent a plurality of indexed distributions as points on an information manifold defined by the set of n-grams that will be identified by the system and one or more additional semantic parameters. In the illustrated implementation, the information manifold is an n-simplex, where n is the number of possible multinomial distributions for a given set of identifiable n-grams and semantic parameters in the universe of discourse represented by the semantic index 16. The multinomial distribution generated for each data record is stored as one point on the information manifold. It will be appreciated that the semantic index 16 can store distributions representing data records from a plurality of sources, such that the semantic index 16 provides a centralized index for the plurality of sources.

A classifier 18 is configured to determine the relevance of a data record to a subject of interest according to the position of a point on the information manifold. Essentially, the semantic index 16 is configured such that a degree of conceptual adjacency between any two data records can be determined from the geodesic between their respective points represented on the information manifold. Accordingly, a user can select one or more points or boundaries representing data records relevant to the subject of interest, and the geodesic distance along the manifold between the selected points and the point representing a new data record can be used to access the relevance of the new record.

In one implementation, the classifier 18 is a support vector machine, and a user can select examples of both relevant and non-relevant data records from the semantic index 16. The support vector machine generates one or more hyperplane boundaries along the information manifold, with points within one or more bounded regions representing data records relevant to the subject of interest and points outside of these regions representing non-relevant data records. When each new data record is indexed, the location of the point relative to the defined hyperplanes can be used to classify the data record as relevant or non-relevant as well as calculate a confidence value, representing an expected degree of relevance for the data record. It will be appreciated that the classifier 18 could comprise multiple support vector machines, representing respective subjects of interest as well as any of a number of other classifier types in addition to or in place of a support vector machine. It will also be appreciated that the classifier 18 could comprise an ensemble of cooperative or non-cooperative meta-classifiers.

It will be appreciated that the illustrated system 10 is simplified for the purpose of illustration, and that a practical implementation of a system in accordance with an aspect of the present invention would likely be distributed across multiple, spatially separated, computer systems. For example, the indexer 12 can comprise multiple indexers across various computer data sources, with one or more of the indexers being local to an associated data source. Similarly, it is likely that various end users of the system might access the system remotely, for example, via a network connection, and the classifier 18 may include one or more classifiers or ensembles of classifiers local to each end user representing subjects of interest to the end user as well as multiple groups that the user belongs to.

Figure 2:
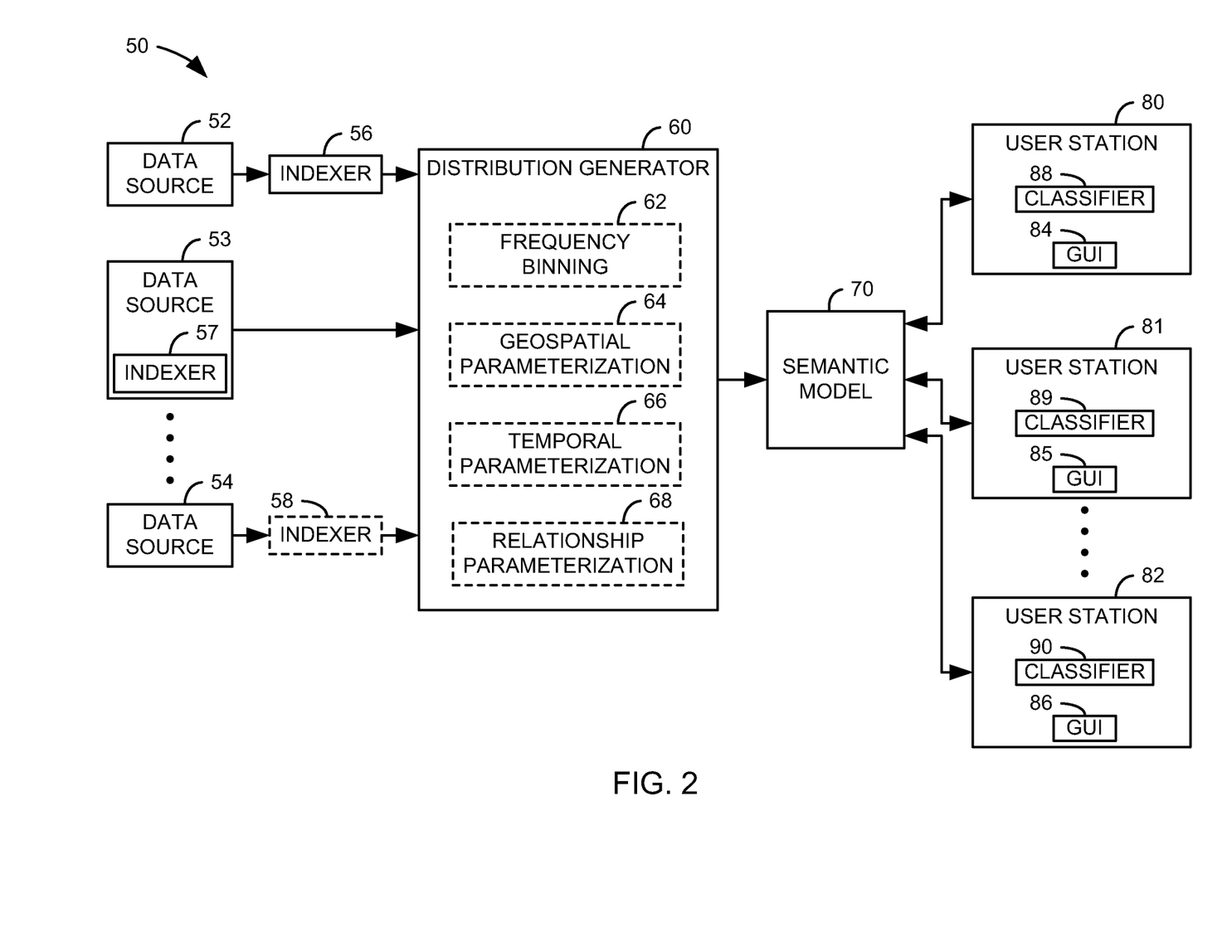
FIG. 2 illustrates an implementation of a system incorporating semantic data alignment in accordance with an aspect of the invention.

FIG. 2 illustrates an implementation of a system 50 incorporating semantic data alignment in accordance with an aspect of the invention. The system 50 comprises a plurality of data sources 52-54 that provide data records for analysis. For example, the data sources 52-54 can include any of television or radio broadcasts, voicemails, an e-mail server, an Internet connection, raw radio, microwave, or optical signals, a relational database, or any other information source. The extracted data records are provided to respective indexing components 56-58 configured to identify occurrences of each of a plurality of n-grams within the data record and provide the corresponding occurrence counts to a distribution generator 60. It will be appreciated that number and identity of the n-grams can vary according to an associated application of the system. It will also be appreciated that a given indexer can be local to its associated data source (e.g., 57), local to the distribution generator 60 (e.g., 58), or at a location other than its associated data source and the distribution generator (e.g., 56).

In the illustrated implementation, each indexing component 56-58 extracts data from incoming data records as a frequency count and provides the data to the distribution generator 60. It will be appreciated that the distribution generator 60 can be distributed across multiple computer systems, and, in one implementation, each indexing component 56-58 can have a local hardware or software component performing the function of the distribution generator 60. In the illustrated implementation, each frequency count can be normalized, either at its indexer 56-58 or the distribution generator 60, according to the total number of n-grams in the data record. From the normalized frequency data, the distribution generator 60 produces a multinomial distribution representing the data record according to its associated frequency count. For example, the multinomial distribution can comprise a plurality of histogram-style bins associated with each n-gram, and a frequency binning mapping component 62 can determine an appropriate bin for the normalized frequency count of the n-gram. This can be repeated for all or a portion of a plurality of n-grams to produce an initial multinomial distribution.

In accordance with an aspect of the present invention, the distribution generator 60 augments the multinomial distribution with semantic categories. In the illustrated example, the distribution generator includes a geospatial parameterization component 64 configured to identify words representing locations within a data record or otherwise associate a location with the data record. It will be appreciated that there may be a single instance or multiple instances of location data in a single data record, and the data added to the multinomial distribution can represent multiple instances where they are present. The geospatial parameterization component 64 is configured to handle different types of locations, such as cities, states, regions, addresses, and countries. Each identified location can be reduced to a representative set of geographic coordinates (e.g., latitude and longitude).

In the illustrated implementation, the representative geographic coordinates for each location can be associated with a specific subregion in each of a series of grids of increasing resolution. For example, a first grid may have subregions that each cover ten degrees of longitude and ten degrees of latitude, a second grid system may have subregions covering a degree each of latitude and longitude, a third grid system covering one-tenth of a degree (i.e., 6 minutes), and so on, until a desired level of resolution is achieved. In one implementation, six grids are used, with the last grid in the series having subregions encompassing one ten-thousandth of a degree. It will be appreciated that a given location can be represented by at least one subregion on each of the plurality of grids. In one implementation, subregions around the subregion associated with a given location can be given a lower, but non-zero weight, to represent their proximity to the location.

Once each location has been assigned to a subregion on each grid, the location can be smoothed over the size scale of the particular grid, such that some weight is assigned to adjacent subregions. The grids associated with each location are then unwrapped into a single histogram. It will be appreciated that the bins comprising the histogram will therefore represent regions of varying sizes. The histograms representing the locations within the data record are then combined to form a composite histogram for the data record. The composite histogram can be added to the multinomial distribution to supplement the n-gram frequency data.

The distribution generator 60 further includes a temporal parameterization component 66 configured to identify words representing times and dates within the data record or otherwise assign a date and time to the data record and provide additional bins in the multinomial distribution relating to the identified dates and times. It will be appreciated that there may be a single instance or multiple instances of time data in a single data record, and the data added to the multinomial distribution can represent multiple instances where they are present. Further, dates and times can be represented in a variety of fashions, including various date and time formats (e.g., 01/01/09 vs. 1 Jan. 2009, 3:30 pm vs. 1530), days of the week (e.g., Tuesday, Tue), holidays, and referenced dates (e.g., same day, next day). The temporal parameterization component 66 can include heuristics for determining a specific date for referenced dates. For example, the heuristics can distinguish between different meanings of time information, such as a time stamp of a report, a time associated with an event described in the report, etc., and determine a specific date from the context. Each identified time and date can be assigned a representative time, for example, in a Unix Epoch representation.

In the illustrated implementation, the representative time for each date and time can be associated with a specific subinterval in each of a series of time frames, each divided into subintervals of varying duration. In one implementation, a first time interval may have subintervals of ten seconds in duration, a second time frame may have subintervals of one hundred seconds in duration, and a third time frame may have subintervals of one thousand seconds in duration. It will be appreciated that the number of time frames used and their respective subinterval durations will vary with the application of the system. It will be appreciated that a given time can be represented by at least one subinterval in each of the plurality of time frames.

Once each time has been assigned to a subinterval in each time frame, the subinterval can be smoothed over the scale of the particular time frame, such that some weight is assigned to adjacent subintervals. The time frames associated with each identified time and date are then unwrapped into a single histogram. It will be appreciated that the bins comprising the histogram will therefore represent time intervals of varying durations. The histograms representing the dates and times within the data record are then combined to form a composite histogram for the data record. The composite histogram can be added to the multinomial distribution to supplement the n-gram frequency data.

A relationship parameterization component 68 can tag a given data record with one or more words not appearing in the data record based on known relationships with identified words. For example, if an individual is mentioned within or otherwise associated with a data record, the multinomial distribution representing the data record can be augmented to include the name of an organization to which the individual is known to belong. Similarly, unnamed individuals related to named individuals via familial relationships and personal relationships can be added. The words and phrases added by the relationship parameterization component 68 can be added with associated value in the distribution determined, for example, by the value associated with the named individual and a weight associated with the relationship type.

The augmented multinomial distribution is provided to a semantic model 70 that represents a plurality of multinomial distributions as points on an information manifold, with each multinomial distribution representing an associated data record. In accordance with an aspect of the present invention, the semantic model 70 can be configured such that the geodesic distance between the points representing two data records provides a measure of the conceptual adjacency between the two records. In other words, data records having related subject matter will tend to be spatially proximate on the information manifold. In the illustrated implementation, the information manifold is defined by the set of identifiable n-grams and one or more semantic parameters and can be represented as an n-simplex, where n is the number of possible multinomial distributions in the universe of discourse represented by the semantic model 70. It will further be appreciated that the semantic model 70 can be a distributed system, with all or a portion of the semantic model 70 stored in multiple locations.

In the illustrated implementation, the semantic model 70 can be accessed from any of a plurality of user stations 80-82, although it will be appreciated that the semantic model can also be made accessible to automated data analysis processes. It will be appreciated that each of the user stations 80-82 can be local to all or a portion of the semantic model 70, all or a portion of the distribution generator 60, a data source 52-54, or an indexer 56-58, or a given user station can be remote from all of these elements. Similarly, the specific functions of the user stations 80-82 can be distributed among multiple locations. Each user station 80-82 includes a graphical user interface (GUI) 84-86 that allows a user to interact with the semantic model 70 and read data records retrieved from the semantic model as well as a corresponding classifier 88-90. For example, the GUI (e.g., 84) can allow a user to retrieve a data record stored at the semantic model 70 or query the documents stored in the semantic model 70 to retrieve documents having specific properties.

In accordance with an aspect of the present invention, a given classifier 88-90 can be trained to identify data records within the semantic model 70 that are relevant to one or more subjects of interest. For example, for each subject of interest, the user can be prompted to select a set of relevant data records and a set of non-relevant data records. Each classifier 88-90 can be trained on these records to associate each new data record with one or more subjects of interest, such that appropriate data records can be provided to each user at the GUI 84-86 as they are received. In one implementation, each classifier 88-90 can include one or more support vector machines, each associated with one of the subjects of interest. Each support vector machine can define a region of the information manifold containing data records relevant to its associated subject of interest, and the relevance of new data records to the subject of interest can be determined from the location of their associated multinomial distribution on the information manifold. It will be appreciated that the classifiers 88-90 can be any of a number of classifier types in addition to or in place of a support vector machine, including an ensemble of cooperative or non-cooperative meta-classifiers.

Figure 3:
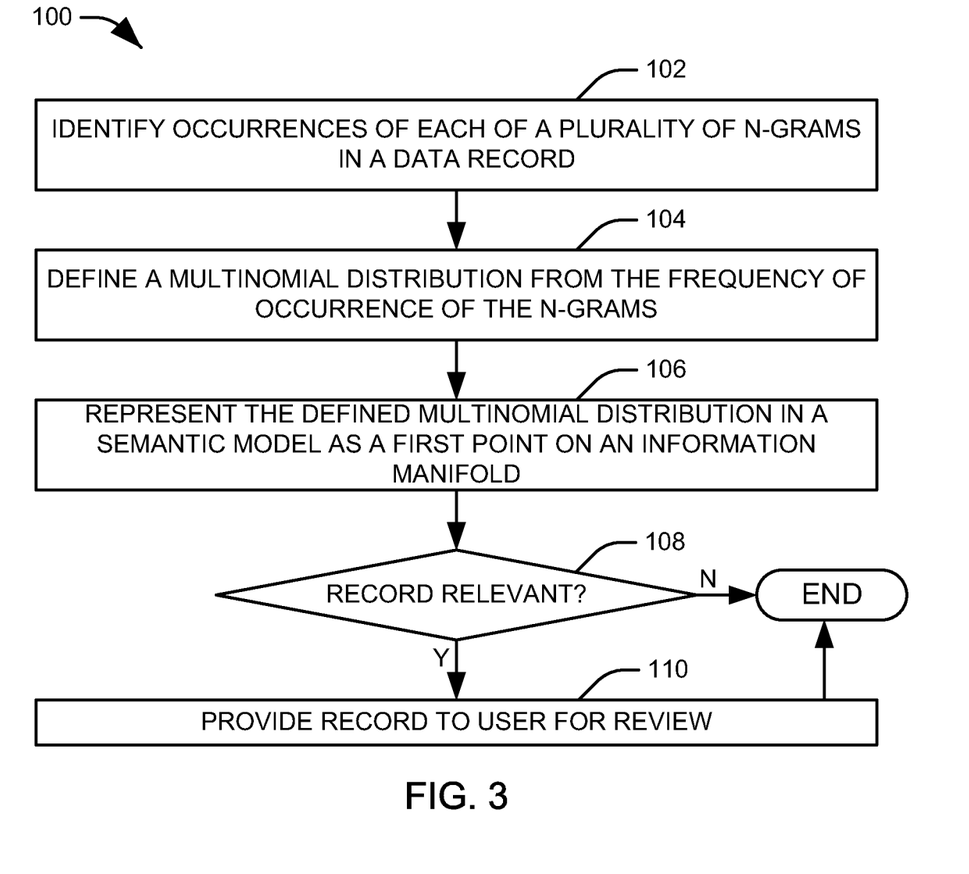
FIG. 3 illustrates a first method for providing data relevant to a subject of interest to a user.
Figure 4:
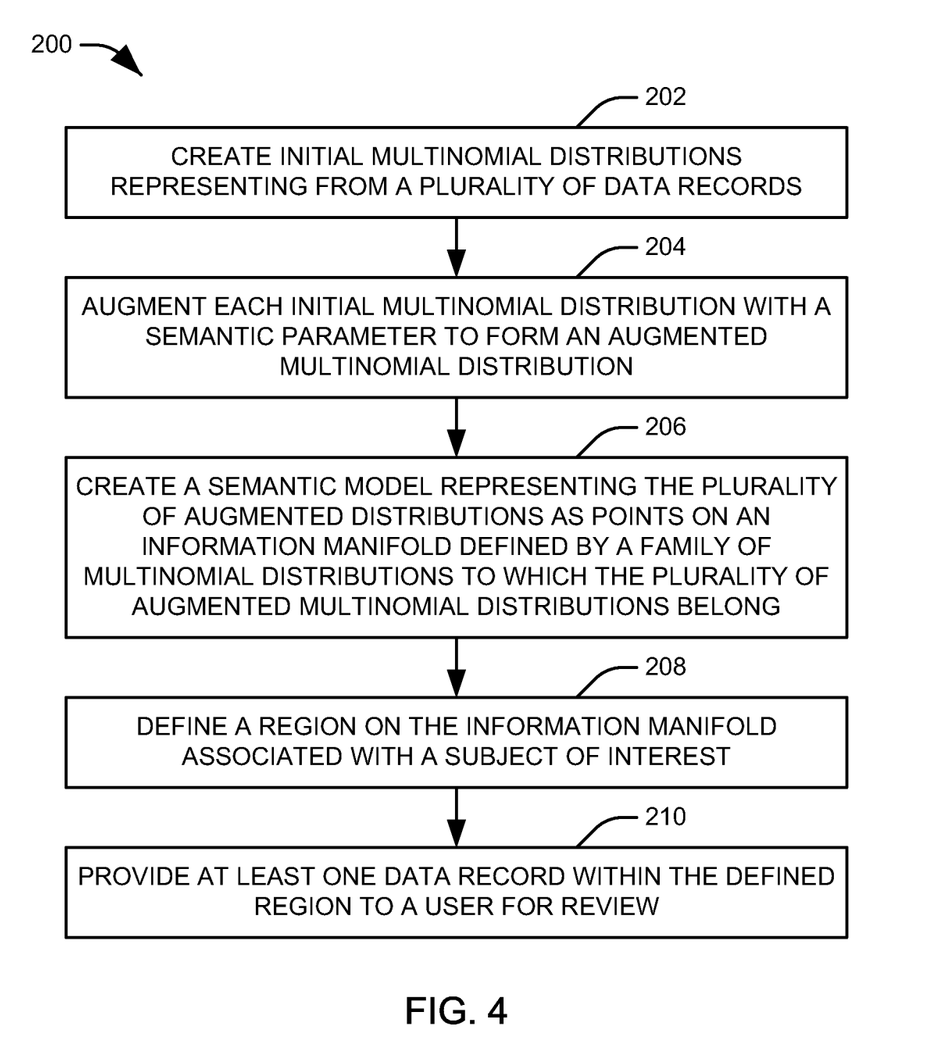
FIG. 4 illustrates a second method for providing data relevant to a subject of interest to a user.

In view of the foregoing structural and functional features described above, methodologies will be better appreciated with reference to FIGS. 3 and 4. It is to be understood and appreciated that the illustrated actions, in other embodiments, may occur in different orders and/or concurrently with other actions. Moreover, not all illustrated features may be required to implement a method.

FIG. 3 illustrates a first method 100 for providing data relevant to a subject of interest to a user. Specifically, the method 100 determines if a particular data record is relevant to the subject of interest. It will be appreciated that the method 100 can be performed by executing machine readable instructions stored on a set of one or more computer readable media at associated processors. Further, where multiple computer readable media are utilized, they can be spatially remote and connected via a network connection. At 102, occurrences of each of a plurality of n-grams are identified within a data record. At 104, a multinomial distribution is defined from the respective numbers of occurrence of a subset of the plurality of n-grams. For example, a histogram-style representation of the data record can be created according to a "bag of words" approach, with the word counts normalized according to a total n-gram count of the data record. In one implementation, the multinomial distribution can be augmented by associating at least one of a n-gram, a set of n-grams, or the data record itself of the with a semantic parameter and defining the multinomial distribution from both the respective numbers of occurrence of the subset of the plurality of n-grams and the semantic parameter. For example, a grid, comprising a plurality of subregions, can be defined over a geospatial region of interest and at least one subregion associated with the data record can be determined and added as bins in the multinomial distribution. Similarly, a series of subintervals over a time frame of interest can be defined, and at least one subinterval associated with the record can be determined and added to the distribution. It will be appreciated that a given location or point in time will therefore be represented on multiple grid systems simultaneously in a given multinomial distribution.

The multinomial distribution is stored in a semantic model at 106 as a representative point on an information manifold. The semantic model is configured to represent a family of possible distributions as points on the information manifold, such that a geodesic distance between any two points on the manifold represent a degree of conceptual adjacency between the data records represented by the points. At 108, it is determined if the data record is relevant to the subject of interest according to the position of the representative point on the information manifold. For example, a geodesic distance between the representative point and a point or boundary on the information manifold representing the subject of interest can be determined and compared to a threshold value. Alternatively, a region on the information manifold can be defined according to user input, and it can be determined if the representative point falls within the defined region. If the data record is relevant to the subject of interest (Y), it is flagged as relevant at 110. In some implementations, flagged data records can be the only data record provided to the user for review. In other implementations, all data records are displayed, but the relevance of the flagged data records can be indicated to the user as part of the display. If the data record is not relevant (N), the data record is not flagged for display.

FIG. 4 illustrates a second method 200 for providing data relevant to a subject of interest to a user. It will be appreciated that the method 200 can be performed by executing machine readable instructions stored on one or more computer readable media at associated processors. Further, where multiple computer readable media are utilized, they can be spatially remote and connected via a network connection. At 202, initial multinomial distributions are created from each of a plurality of data records. For example, a count of occurrences of each of a plurality of n-grams can be identified within each data record and a histogram-style representation of the data record can be created according to a "bag of words" approach.

At 204, each initial multinomial distribution can be augmented with a semantic parameter to form an augmented multinomial distribution. The semantic parameter can represent a portion of the semantic content of the data record associated with the initial multinomial distribution. For example, the semantic parameter can represent location data associated with one or more of the n-grams, times and dates represented in the data record, or additional n-grams related to an n-gram in the data record (e.g., family members or organization associated with individuals mentioned in a document). Alternatively, the semantic parameter can represent a property of the data record itself, such as a frequency of an RF or microwave signal, a time of receipt of a communication, or an associated source of the data record.

In one implementation, a plurality of grids is defined over a geospatial region of interest, with each grid comprising a plurality of subregions. The subregions comprising each grid can have different sizes, such the subregions of a first gird can have a first area and the subregions of the second grid have an associated second area greater than the first area. One or more subregions can be selected from each of the plurality of grids and added to the multinomial distribution to represent locations mentioned in the data record with varying degrees of resolution. Similarly, a plurality of sets of subintervals is defined over a time frame of interest, with each set comprising a plurality of subintervals. The subintervals comprising each set can have different durations, and one or more subintervals can be selected from each set and added to the multinomial distribution to represent times and dates mentioned in the data record with varying degrees of resolution.

At 206, a semantic model is created representing the plurality of augmented distributions as points on an information manifold. The semantic model is configured to represent a plurality of indexed distributions such that the spatial proximity of distributions represented on the information manifold represents the degree of conceptual adjacency between the data records represented by the distributions. In one implementation, the information manifold is defined by the set of n-grams that will be identified and one or more additional semantic parameters and can be represented as an n-simplex, where n is equal to the number of distributions in a family of probability distributions defined by the universe of discourse represented by the information manifold. At 208, a region on the information manifold associated with the subject of interest is defined. For example, the user can be allowed to select a first set of the plurality of data records that are relevant to the subject of interest and a second set of the plurality of data records that are not relevant to the subject of interest. The region on the information manifold can be defined according to the selected first and second sets. For example, the sets can be used to train a support vector machine, with the support vector machine defining regions on the manifold containing data records relevant to the subject of interest. At 210, at least one data record within the defined region is provided to the user for review. For example, the data records can be provided to the user via a graphical user interface or accessed by an automated data analysis process.

Figure 5:
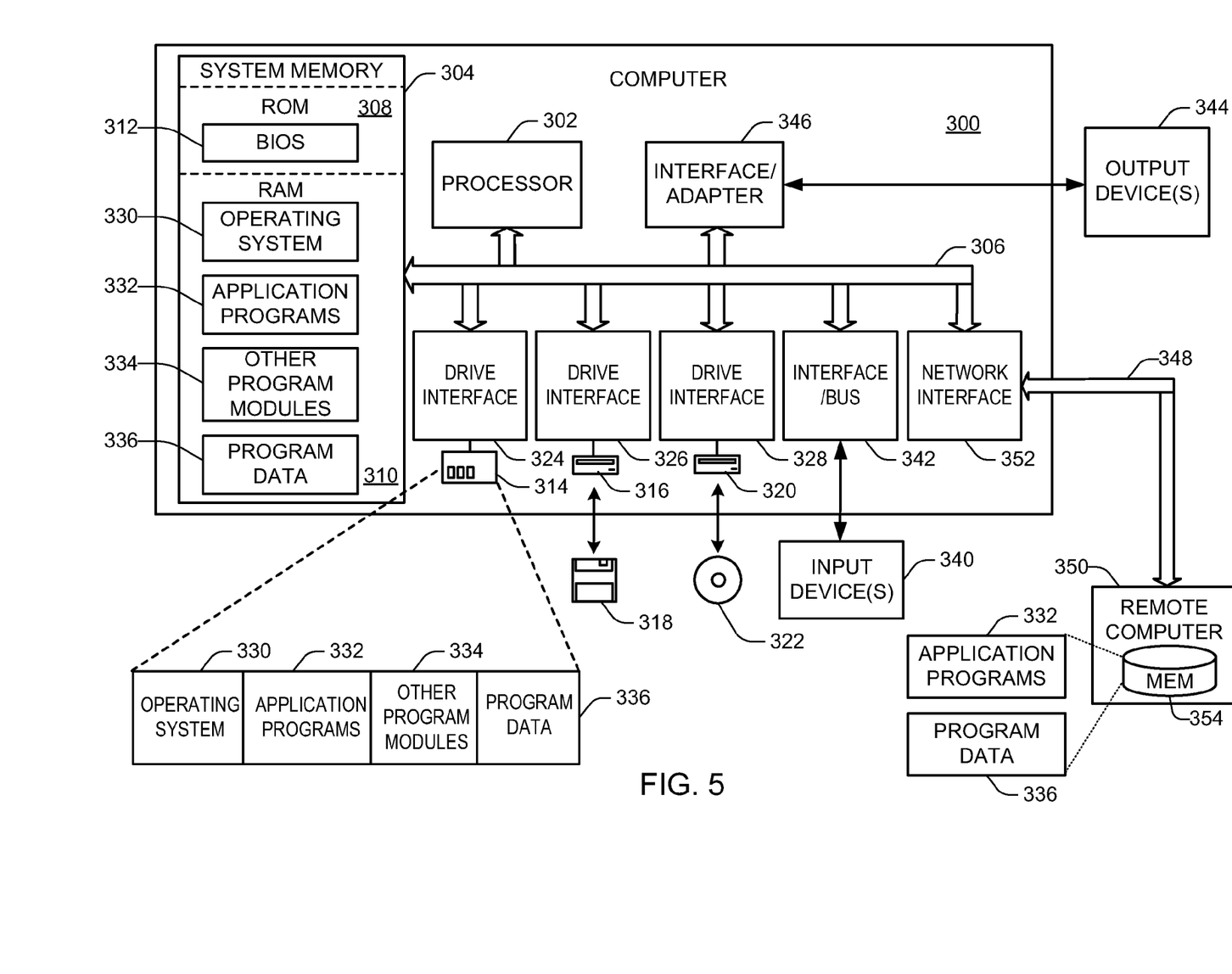
FIG. 5 illustrates a schematic block diagram of an exemplary operating environment for a system configured in accordance with an aspect of the invention.

FIG. 5 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the client and/or server executing instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 328, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336. A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346. The visual display could be used, for example, to display a graphical user interface, as discussed herein.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A system for identifying the relevance of a data record to a subject of interest comprising:
at least one non-transitory computer readable medium storing machine executable instructions comprising:
an indexer configured to identify occurrences of each of a plurality of n-grams within the data record;
a distribution generator configured to associate at least one of the plurality of n-grams with a semantic parameter, where a semantic parameter is a value derived at least one of associated meanings, inter-symbol structure, and associated source properties of the data record, and define a multinomial distribution from the respective numbers of occurrence of a subset of the plurality of n-grams and the assigned semantic parameter;
a semantic model configured to represent a family of probability distributions as points on an information manifold, the information manifold having an intrinsic geometry defined by the family of probability distributions such that a distance between two points on the information manifold represents a similarity between the probability distributions represented by the two points and the semantic model storing the multinomial distribution as a point on the information manifold;
a classifier configured to determine the relevance of the data record according to the position of the point on the information manifold; and
a processor operatively connected to one or more of the at least one non-transitory computer readable media and configured to execute at least a subset of the machine executable instructions.

2. The system of claim 1, the information manifold being represented as an N-simplex, where N is equal to a number of possible distributions for a given set of identifiable n-grams and semantic parameters in a universe of discourse represented by the information manifold.

3. The system of claim 1, wherein the semantic parameter represents a geographic location associated with the data record.

4. The system of claim 1, wherein the semantic parameter represents a time period associated with the data record.

5. The system of claim 1, wherein the semantic parameter comprises an additional n-gram that is not present in the data record but is related to one of the plurality of n-grams.

6. The system of claim 5, wherein the additional phrase is a name of an organization and the one of the plurality of n-grams is a name of an individual in the organization.

7. The system of claim 5, wherein the one of the plurality of n-grams in a name of a first individual and the additional n-gram is a name of a second individual having a familial relationship to the first individual.

8. The system of claim 1, wherein the classifier comprises at least one support vector machine configured to define a region on the information manifold containing a plurality of indexed distributions representing data records relevant to the subject of interest.

9. A computer implemented method for retrieving data relevant to a subject of interest comprising:
creating respective initial multinomial distributions from each of a plurality of data records;
augmenting each initial multinomial distribution with a semantic parameter to form a plurality of augmented multinomial distributions from a family of multinomial distributions, the semantic parameter for each initial multinomial distribution representing a portion of a semantic content of the data record associated with the initial multinomial distribution as a value derived at least one of associated meanings, inter-symbol structure, and associated source properties of a data record;
creating a semantic model representing the plurality of augmented distributions as points on an information manifold, the information manifold having an intrinsic geometry defined by the family of multinomial distributions such that a distance between two points on the information manifold represents a similarity between the multinomial distributions represented by the two points;
defining a region on the information manifold associated with the subject of interest; and
retrieving at least one data record within the defined region.

10. The computer implemented method of claim 9, wherein retrieving the at least one data record comprises providing the at least one data record to a user via a graphical user interface.

11. The computer implemented method of claim 9, wherein defining a region on the information manifold comprises:
allowing the user to select a first set of the plurality of data records that are relevant to the subject of interest and a second set of the plurality of data records that are not relevant to the subject of interest; and
defining the region on the information manifold according to the selected first and second sets.

12. The computer implemented method of claim 11, wherein defining the region on the information manifold according to the selected first and second sets comprises training a support vector machine on the first and second sets.

13. The computer implemented method of claim 9, wherein augmenting each initial multinomial distribution with a semantic parameter comprises:
defining a first grid over a geospatial region of interest, the first grid comprising a first plurality of subregions each having a first area;
defining a second grid over the geospatial region of interest, the second grid comprising a second plurality of subregions, each of the subregions of the second grid having a second area greater than the first area; and
determining at least one subregion of the first plurality of subregions and at least one subregion of the second plurality of subregions associated with the portion of the semantic content of the data record.

14. A system comprising:
a first non-transitory computer readable medium storing a first set of machine executable instructions;
a first processor and operatively connected to the first non-transitory computer readable medium, the first processor being local to the first non-transitory computer readable medium;
a second non-transitory computer readable medium storing a second set of machine executable instructions, the second non-transitory computer readable medium being remote from the first non-transitory computer readable medium and connected via a network connection; and
a second processor and operatively connected to the second non-transitory computer readable medium, the second processor being local to the first non-transitory computer readable medium;
wherein the first non-transitory computer readable medium and the second non-transitory computer readable medium collectively store machine readable instructions configured to perform a method comprising
creating respective initial multinomial distributions from each of a plurality of data records;
augmenting each initial multinomial distribution with a semantic parameter to form a plurality of augmented multinomial distributions from a family of multinomial distributions, the semantic parameter for each initial multinomial distribution representing a portion of a semantic content of the data record associated with the initial multinomial distribution as a value derived at least one of associated meanings, inter-symbol structure, and associated source properties of a data record;
creating a semantic model representing the plurality of augmented distributions as points on an information manifold, the information manifold having an intrinsic geometry defined by the family of multinomial distributions such that a distance between two points on the information manifold represents a similarity between the multinomial distributions represented by the two points;
defining a region on the information manifold associated with a subject of interest; and
retrieving at least one data record within the defined region.

15. A method for providing data relevant to a subject of interest to a user comprising:
identifying occurrences of each of a plurality of n-grams within the data record;
defining a multinomial distribution from the respective numbers of occurrence of a subset of the plurality of n-grams, wherein defining the multinomial distribution comprises associating at least one of the n-grams with a semantic parameter, the semantic parameter being a value derived at least one of associated meanings, inter-symbol structure, and associated source properties of the data record, and defining the multinomial distribution from the respective numbers of occurrence of the subset of the plurality of n-grams and the semantic parameter;
storing the multinomial distribution in a semantic model as a point on an information manifold, the semantic model being configured to represent a plurality of indexed distributions as points on the information manifold, and the information manifold being an N-simplex, where N is an integer greater than one;
determining if the data record is relevant to the subject of interest according to the position of the point on the information manifold; and
providing the data record to the user for review if the data record is relevant to the subject of interest.

16. The method of claim 15, wherein associating at least one n-gram with a semantic parameter comprises:
defining a grid over a geospatial region of interest, the grid comprising a plurality of subregions; and
determining at least one subregion of the plurality of subregions associated with the at least one n-gram.

17. The method of claim 15, wherein associating at least one n-gram with a semantic parameter comprises:
  defining a series of subintervals over a time frame of interest; and
  determining at least one subinterval of the series of subintervals associated with the at least one n-gram.

18. The method of claim 15, wherein associating at least one n-gram with a semantic parameter comprises identifying a relationship between one of the plurality of n-grams and an additional n-gram that is not present in the data record, and representing the additional n-gram in the multinomial distribution.

19. A computer implemented method for retrieving data relevant to a subject of interest comprising:
  creating respective initial multinomial distributions from each of a plurality of data records;
  augmenting each initial multinomial distribution with a semantic parameter to form a plurality of augmented multinomial distributions from a family of multinomial distributions, the semantic parameter for each initial multinomial distribution representing a portion of a semantic content of the data record associated with the initial multinomial distribution as a value derived at least one of associated meanings, inter-symbol structure, and associated source properties of a data record, and the augmenting of each initial multinomial distribution with a semantic parameter comprising;
  defining a series of subintervals over a time frame of interest; and
  determining at least one subinterval associated with the portion of the semantic content of the data record;
  creating a semantic model representing the plurality of augmented distributions as points on an information manifold, the information manifold having an intrinsic geometry defined by the family of multinomial distributions such that a distance between two points on the information manifold represents a similarity between the multinomial distributions represented by the two points; and
  defining a region on the information manifold associated with the subject of interest; and
  retrieving at least one data record within the defined region.

* * * * *